Patented Dec. 18, 1951

2,579,419

UNITED STATES PATENT OFFICE 2,579,419

PYRIDYL SUBSTITUTED KETONES

Albert M. Clifford, Stow, Ohio, assignor to Wingfoot Corporation, Akron, Ohio, a corporation of Delaware No Drawing. Application July 13, 1946, Serial No. 683,413

7 Claims. (Cl. 260—297)

This invention relates to a new class of substituted pyridines and to a method for their preparation from readily available raw materials. More specifically, the invention relates to compounds prepared by the addition of vinyl pyridine with ketones.

In accordance with this invention compounds containing carbonyl groups attached directly to a carbon atom in each of two organic radicals may be reacted with 2-vinyl pyridine to produce 2-(2-pyridyl) ethyl ketones compounds previously unknown. The new substances are definite chemical compounds, the result of addition between equimolecular proportions of ketone and vinyl pyridine.

The preferred ketones for the practice of this invention are those having an alpha carbon atom carrying at least one hydrogen atom and having the structural formula

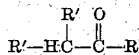

in which R is a hydrocarbon radical, a radical containing a sulfur atom, or a radical containing an oxygen atom, and R' may be either hydrogen or a radical of the R group. The R' radicals may be either the same or different radicals. The R hydrocarbon radicals include the alkyl radicals, such as methyl, ethyl, butyl, octyl, dodecyl and cetyl, the aryl radicals, such as phenyl and naphthyl, the aralkyl radicals, such as benzyl, phenylethyl, and naphthylethyl, the alkaryl radicals, such as tolyl, ethylphenyl, and methylnaphthyl, and the cycloaliphatic radicals, such as cyclohexyl and cyclopentyl. In addition to hydrocarbons, R radicals in the above structural formula may contain one or more oxygen atoms, or sulfur atoms which are substituted for $CH_2$ groups including the alkoxyalkyl radicals, such as methoxyethyl and ethoxybutyl, the aryloxy alkyl radicals, such as phenoxyethyl and naphthyloxy methyl, the alkoxyaryl radicals, such as methoxy phenyl and ethoxynaphthyl, the aryloxyaryl radicals, such as phenoxyphenyl, and phenoxynaphthyl, and the alkoxy or aroxy-substituted cycloaliphatic radicals, such as methoxy cyclohexyl and phenoxy cyclopentyl and the corresponding thiahydrocarbon radicals.

Other useful ketones are those of the structural formula in which R' and one of the R radicals represent a single divalent aliphatic hydrocarbon radical, radicals containing oxygen or sulfur, such as cyclopentanone, cyclobutanone, cyclohexanone, cyclopentenone, 3-thia-cyclohexanone,

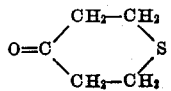

3-oxa-cyclohexanone,

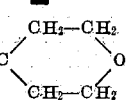

and the derivatives of other cyclic ketones containing oxygen or sulfur atoms. Still other useful ketones are those which include an ester linkage in one or more of the R and R' radicals, for example ethyl aceto acetate, methyl pyruvate, ethyl levulate, methyl mesitonate and homologues thereof.

Generally the useful ketones may be defined by the general formula:

wherein R is a radical of the group consisting of —R'',

and

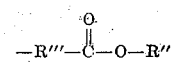

R' is a radical of the group consisting of hydrogen and R'', R'' is a monovalent radical of the group consisting of hydrocarbon, radicals containing oxygen or sulfur atoms, and R''' is a divalent radical of the group consisting of hydrocarbon, and radicals containing oxygen or sulfur atoms.

The condensation or addition between 2-vinyl pyridine and the ketones is effected by mixing the reactants and heating them at reflux temperatures. Generally, any period of time may be used but preferred operations require two to 12 hours. Usually, it is desirable to conduct the reaction in the presence of a polymerization inhibitor to prevent the vinyl pyridine from becoming polymerized during the reaction. The addition of a ketone to vinyl pyridine is aided by an alkaline catalyst, such as caustic soda, sodium alcoholate or trimethyl benzyl ammonium hydroxide. Suitable polymerization inhibitors are hydroquinone, resorcinol and diphenyl-para-phenylene-diamine. The vinyl pyridine, the ketone and the polymerization inhibitor are usually charged into a glass-lined reactor provided with a water-cooled reflux condenser. When the reaction is complete the reaction mass may be transferred to a separate distillation flask or tower, or the distillation may be effected from the reaction flask by replacing the reflux condenser with a suitable receiver. The majority of the reaction products can be separated by fractional distillation at reduced pressures, but some require other methods of separation, such as fractional crystallization from solutions in suitable solvents.

The new chemical compounds are useful as plasticizers, as intermediates for the preparation of industrial and pharmaceutical chemicals.

Further details of the practice of this invention are set forth with respect to the following specific examples.

*Example 1*

A glass reaction vessel provided with a water-cooled reflux condenser was charged with 105 grams of 2-vinyl pyridine, 144 grams of methylethylketone and 3 cc. of a 40 percent solution of trimethyl benzyl ammonium hydroxide and heated at the reflux temperature for 8 hours. The reaction mass was transferred to a suitable vacuum distillation flask and the fraction boiling between 150 and 155° C. at 22 mm. was separated. This product was identified as a condensation product of equimolecular proportions of vinyl pyridine and methylethylketone.

*Example 2*

Using the apparatus and procedure described in the preceding example, 105 grams of 2-vinyl pyridine were condensed with 147 grams of cyclohexanone in the presence of 2 grams of tertiary butyl catechol and 3 cc. of a 40 percent solution of trimethylbenzyl ammonium hydroxide by refluxing for a 10 hour period. The distillation of the reaction mass yielded a substantial proportion of the condensation product of equimolar proportions of vinyl pyridine and cyclohexanone.

*Example 3*

Using the apparatus and procedure described in Example 1, 105 grams of 2-vinyl pyridine and 130 grams of the ethyl ester of acetoacetic acid were condensed in the presence of 3 cc. of a 40 percent solution of trimethylbenzyl ammonium hydroxide by heating on a steam bath for 10 hours, followed by heating at reflux temperatures for 3 hours. The distillation yielded a substantial proportion of a material boiling at 152–155° C. at 2 mm. pressure. The compound separated was identified as the equimolecular condensation product of acetoacetic ethyl ester and vinyl pyridine.

Condensation products of 2-vinyl pyridine and acetone, methyl isobutyl ketone, diethyl ketone, methyl propyl ketone, cyclopentanone, acetophenone and propriophenone may similarly be prepared.

Although the invention has been described with respect to specific modifications thereof, it is not intended that the details set forth shall be construed as limitations upon the scope of the invention except to the extent incorporated in the following claims.

I claim:

1. The method of preparing 2-(2-pyridyl) ethyl ketones which comprises heating, in the presence of an alkaline catalyst and an inhibitor of polymerization for 2-vinyl pyridine, a ketone having an alpha carbon atom carrying at least one hydrogen atom with 2-vinyl pyridine, and separating the resulting unpolymerized product, the ketone being selected from the group consisting of alkyl ketones, aryl ketones, aralkyl ketones, alkaryl ketones, cycloaliphatic ketones, alkoxyalkylketones, aryloxyalkyl ketones, alkoxyaryl ketones, aryloxyaryl ketones, alkoxy-substituted cycloaliphatic ketones, aroxy-substituted cycloaliphatic ketones, and unsubstituted saturated 6 membered cycloalkyl ketones in which a single ring —CH$_2$— group is replaced by the member of the group consisting of oxygen and sulphur.

2. An unpolymerized ketone having the general formula

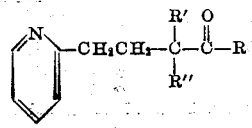

in which R' and R" are selected from the group consisting of hydrogen and a hydrocarbon radical, and in which R is a hydrocarbon radical and in which, where R' is hydrogen, R and R" taken together may be a tetramethylene group.

3. The method of preparing a 2-(2-pyridyl) ethyl ketone which comprises heating, in the presence of an alkaline catalyst and an inhibitor of polymerization for 2-vinyl pyridine, methyl ethyl ketone with 2-vinyl pyridine, and separating the resulting unpolymerized product.

4. The method of preparing a 2-(pyridyl) ethyl ketone which comprises heating, in the presence of an alkaline catalyst and an inhibitor of polymerization for 2-vinyl pyridine, cyclohexanone with 2-vinyl pyridine, and separating the resulting unpolymerized product.

5. The method of preparing a 2-(2-pyridyl) ethyl ketone which comprises heating, in the presence of an alkaline catalyst and an inhibitor of polymerization for 2-vinyl pyridine, ethyl acetoacetic acid with 2-vinyl pyridine, and separating the resulting unpolymerized product.

6. An unpolymerized ketone having the formula

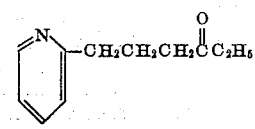

7. An unpolymerized ketone having the formula

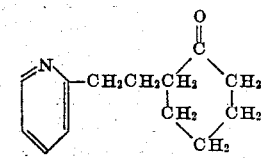

ALBERT M. CLIFFORD.

REFERENCES CITED

The following references are of record in the file of this patent:

UNITED STATES PATENTS

| Number | Name | Date |
|---|---|---|
| 1,937,063 | Meisenburg et al. | Nov. 28, 1933 |
| 2,469,295 | Meier | May 3, 1949 |

OTHER REFERENCES

Sidgwicks: Organic Chemistry of Nitrogen, new edition, pp. 522–523.